United States Patent 3,224,931
Dec. 21, 1965

3,224,931
FUNGICIDAL COMPOSITIONS
William E. Burt, Royal Oak, Mich., assignor to Ethyl Corporation, New York, N.Y., a corporation of Virginia
No Drawing. Filed Dec. 22, 1961, Ser. No. 161,386
10 Claims. (Cl. 167—22)

This invention relates to fungicidal compositions, and more particularly, to fungicidally potent organoiron compounds and their use in combating fungi.

An object of this invention is to provide new fungicidal compositions. Still another object is to provide a new means for combating fungi. A further object is to provide new fungicidal compositions comprising conditioning agents and certain organoiron compounds as described herein.

The above and other objects are accomplished by the present invention which resides in providing fungicidal compositions comprising a conditioning agent and as a principal active ingredient, a compound having the formula:

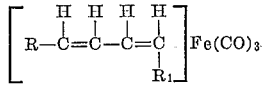

wherein R is selected from the class consisting of hydrogen and the methyl radical and $R_1$ is selected from the class consisting of hydrogen,

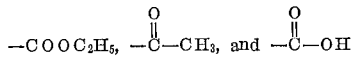

compounds of this type can be prepared by reacting the corresponding diene with iron pentacarbonyl, according to the general method of Reihlen et al., Ann. 482, 161–182 (1930).

These compounds can be considered to be derivatives of sorbic acid iron tricarbonyl and vinylacrylic acid iron tricarbonyl. When R in the above formula is the methyl radical and $R_1$ is the carboxy radical, the compound is sorbic acid iron tricarbonyl. When $R_1$ is the carboethoxy radical ($COOC_2H_5$) and R is the methyl radical, the compound is ethyl sorbate iron tricarbonyl. Similarly, when R is the methyl radical and $R_1$ is the amido radical, the compound is sorbamide iron tricarbonyl. When R is methyl and $R_1$ is the cyano radical, the compound is sorbonitrile iron tricarbonyl. When $R_1$ is the aldehydo radical and R represents the methyl radical, the compound is sorbaldehyde iron tricarbonyl.

When R is hydrogen and $R_1$ is the carboxy radical, the compound depicted above is vinyl acrylic acid iron tricarbonyl. Similarly, when R is hydrogen and $R_1$ is the carbethoxy radical, the compound is ethyl vinylacrylate iron tricarbonyl. When R is hydrogen and $R_1$ is the amido radical, the compound is vinyl acrylamide iron tricarbonyl. When R is hydrogen and $R_1$ is the cyano radical, the compound is vinyl acrylonitrile iron tricarbonyl. In like manner, the formula depicted above represents the compound vinylacrylaldehyde iron tricarbonyl when R is hydrogen and $R_1$ is the aldehydo radical.

The sorbic acid derivatives described above are preferred because of their high fungicidal activities. The most preferred compounds are sorbic acid iron tricarbonyl and ethyl sorbate iron tricarbonyl.

When $R_1$ is hydrogen, the compounds depicted by the above formula are butadiene derivatives, butadiene iron tricarbonyl, or 1-methyl butadiene iron tricarbonyl, in the case where R is hydrogen and the methyl radical respectively. Because of the high fungicidal activity of the butadiene iron tricarbonyl compounds, i.e., where R is hydrogen, these compounds are preferred. For example, the preferred compounds are butadiene iron tricarbonyl and acetyl butadiene iron tricarbonyl. The latter compound is depicted by the above formula when $R_1$ is the acetyl group, and R is hydrogen.

Such compounds as described above are useful in combating fungi when they are applied to the locus of the fungi. Such treatment, therefore, constitutes one aspect of the invention. It has been found that the above materials are useful in controlling and eliminating fungi which infest vegetables, animals and man. A facet of this invention is a novel method of combating and controlling fungi. Accordingly, one embodiment of this invention is the method of combating fungi which comprises contacting the fungus with a fungitoxic amount of a compound having the formula given above. Another aspect of this invention is the provision of a method for controlling fungi which comprises treating matter susceptible to fungal infestation with the compound of the above formula.

For maximum effectiveness, the active ingredient of the present invention is admixed in fungicidally effective amount with a conditioning agent of the type commonly referred to as a pest controlled adjuvant or modifier. Such adjuvants have been referred to by names such as conditioning agent, dispersing agent, surface active agent, and surface active dispersing agent. Their purpose is to extend the active ingredient to assure its efficacious penetration of, or application to, the locus being treated and to adapt the active ingredients for ready and efficient application by using conventional equipment.

An advantage of using these conditioning agents is that the fungicidally active compounds may be too effective or too potent when used alone to be of practical utility. Another advantage derived from the use of these adjuvants is to permit field application by methods readily employed and still obtain effectively complete coverage of the material being protected.

Formulations of the fungicidally active ingredient with a suitable conditioning agent comprise both liquid and solid types as well as the aerosol type of formulation. The liquid type of formulation can have water, an organic solvent, or an oil-water emulsion and the like as the conditioning agent.

It is also intended that the term conditioning agent includes solid carriers such as talc, Attaclay, kieselguhr, chalk, diatomaceous earth, and the like, and various mineral powders, such as calcium carbonate, which act as a dispersant, as a carrier, and in some instances, perform the function of a surface active agent.

The conditioning agent may also be an industrial commodity such as paint, raw polymer, finished plastic and the like. Such industrial materials act as a diluent, dispersant, wetting agent, and extender for the active ingredient, thus enhancing its fungicidal action.

The formulations of this invention, therefore, comprise the above defined fungicidally active ingredient in a suitable material as a dispersant or conditioning agent. It is not intended that this invention be limited to any specific proportions of active ingredient and conditioning agent. The important feature of the invention is to provide a formulation of such concentration that is appropriate for the desired application. The conditioning agent will be present to provide the proper type of contact with the material being protected.

Nor is it intended that the invention be limited to the use of a fungicidally active ingredient in the presence of only a compound or product or material known as a conditioning agent. It has been found that other additives are useful in the preparation of the fungicidal preparations. Other materials found useful are classified as spreading agents and adhesives. Spreading agents tend to increase the area covered by a spray liquid. Many chemicals act as both wetting and spreading agents. Dried blood (blood albumin), sulfite lye, both in the liquid and dehydrated forms, and petroleum emulsions belong to this group. Adhesives increase the adherence of the active agent to the treated surface to augment resistance to wear and mechanical action. Bentonite and other clays, gelatin and glue, are examples of adhesives.

As mentioned previously, the fungicidal preparations are in the form of either liquid or dry or aerosol formulations. Liquid compositions, either solutions or dispersions, frequently also contain a surface active dispersing agent in amounts sufficient to render the composition readily useful in aqueous spray application. The surface active dispersing agents referred to herein are sometimes known as wetting, dispersing or penetrating agents. They are agents which cause the formulations to be easily dispersed in water. They can be of the anionic, cationic, or nonionic type and include salts of long chain fatty acids, sulfonated oils, both vegetable and animal, petroleum oils, sulfates of long chain alcohols, phosphates of long chain alcohols, various polyethylene oxides, condensation products of ethylene oxide with alcohol and phenols, quaternary ammonium salts, and the like. The surface active agent will usually be present to the extent of 0.1 to 5 percent of the formulation. Typical of the liquid formulations is the water solution or dispersion of the active ingredients. Example I below is an example for the preparation of an aqueous suspension of a typical active ingredient described in this invention.

The active ingredients can also be dispersed or suspended in various organic solvents such as alcohols, ketones, hydrocarbons, and petroleum fractions such as kerosene, dimethylformamide, and the like. In these cases a surface active dispersing agent is usually present to provide ready dispersability with water.

The solubility of the active ingredients of this invention in organic solvents, furthermore, is such that they can be applied advantageously in the form of a solution in this type of solvent. In certain uses, this type of vehicle is preferred, for example, in treating cloth, leather, or other fibrous articles. In these applications, it is preferred to apply the pesticides dissolved in a *volatile* solvent. After application, the volatile solvent evaporates leaving the fungicide impregnated throughout the surface of the article and in the dispersed form which has been found to be most advantageous. Likewise, in applying the fungicides to smooth surfaces, as for example in treating wood, a solution may be the most practical vehicle for applying the protective film. Brushing, spraying, or dipping may be the application method of choice. The choice of an appropriate solvent is determined largely by the solubility of the active ingredients which it is desired to employ, by the volatility required in the solvent, by the spreading or flow characteristics thereof, and by the nature of the material being treated. Typical formulation of this type is described in Example II below.

Another typical formulation of the fungicidal ingredients is an oil in water emulsion (see Example III). Generally these are prepared by dissolving the fungicidally active ingredient in an organic solvent, usually a petroleum fraction like kerosene, and then dispersing this solution with vigorous agitation in a large volume of water containing a minor amount of a surface active agent.

In addition to the adjuvants and other ingredients described above, it has been found that one can incorporate an adherent or sticking agent such as vegetable oils, naturally occurring gums, and other adhesives in the active ingredient formulations. Likewise, humectants can be employed in the formulations. Furthermore, the formulations can be employed in admixture with other pesticidal materials or other biocides such as insecticides, larvacides, bactericides, germicides, miticides or with other materials which it is desired to apply along with the fungicides. In like manner, two or more of the active ingredients may be formulated together in a single composition, thus achieving control of a broader spectrum of fungi.

Fungicides can be applied in dry media as well as in liquid suspensions or solutions. In fact, early practice in the art used dust formulations almost exclusively. It was only the advent of the introduction of spray machinery that caused dust formulations to be considered with disfavor. However, it was soon realized that spraying was often not as convenient as dusting, particularly when large, comparatively inaccessible cultivated fields are to be treated or when the area of interest necessarily requires that it be treated with a dry agent. Dust formulations of my active compounds have a ready place in the art and indeed the use of these dry formulations should grow with time, since they are utilizable when treating large areas for fungicidal infestation by airplane dusting. Dusting is also extensively employed in treating man and animal for fungicidal infestations.

A measure of the utility of the dust formulation is the impressive amount of research which has been performed in this area. The particle's shape, the size, density and hardness, and the nature of the dry diluent have been shown to be factors which are important as well as the absorption and adsorption characteristics thereof. Therefore, another desired and efficacious formulation of the fungicidally active ingredient is a dust formulation which is prepared generally by milling the active ingredient in ball mill within the presence of a dry material, for example, fuller's earth. After milling, the mixture is screened and the fraction passing through a very fine sieve is collected. Thereafter, a further dilution is made by repeating the above procedure with an additional very large amount of a compound such as fuller's earth. Example IV exemplifies a dust formulation. A preferred formulation of the compounds comprises a wettable powder. In preparing wettable powders, several formulation procedures are possible (see Example V for one type of procedure). It is one intention of this invention to provide compositions comprising the active ingredient defined herein in combination with a minor amount of surface active agent. Such surface active agents can be chosen for example from those previously mentioned in connection with aqueous dispersion. Still other surface active agents can be employed, the above merely showing a representative list of the more common material. Such formulations can be readily admixed with a solid carrier. Formulations thus formed then comprise the active ingredient of this invention, an inert carrier, and a surface active agent. Among the inert carriers which can be employed in preparing wettable powders are soya bean flour, tobacco flour, walnut shell flour, gypsum, mica, talc, apatite, pumice and the like. In preparing concentrated wettable powders it is preferred to employ between 0.01 and 5 percent of the surface active agent, based upon the amount of active ingredient, and up to 85 percent of the inert carrier based upon the total amount of the formulation. Such concentrated formulations provide the advantage of permitting economical storage and transportation of the fungicide and permit further dilution by simple admixture with water at the time of application.

The compounds described above are also active in colloidal formulations. A colloidal formulation is prepared by passing a mixture of the active ingredient, a hydrocarbon solvent and a large amount of water through a colloid mill until homogenation of the oil and water is achieved. Example VI gives an example of the preparation of a colloidal formulation.

The compounds also find effective use when formulated in aerosol formulations, i.e., when mixed with a liquid of low boiling point that changes to a gas when released from a confined space. Examples of diluent used in these formulations are fluorinated hydrocarbons such as tetrafluoromethane, and hexafluoroethane. Mixed halogenated compounds containing fluorine and chlorine such as difluorodichloromethane and pentafluorochloroethane and the like can also be used as the liquid having the necessary low boiling point. Other materials such as carbon dioxide, sulfur dioxide, hydrogen sulfide and ammonia can be used, and of these, carbon dioxide generally is preferred. One method of preparing such aerosol formulations comprises introducing by new compounds into a pressure cylinder and later introducing the liquifying diluent under pressure followed by mixing the cylinder to obtain uniform solution. If desired, smaller containers can then be filled from the cylinder in which the formulation is prepared. In many cases it is desirable to add a second solvent to the low boiling material of the type described above so as to more readily dissolve my compounds. Examples of such co-solvents are benzene, acetone, carbon tetrachloride and the like. Example VII is an example of the preparation of an aerosol type formulation of my active ingredient.

My compounds are also effective when formulated in an ointment for topical application to the epidermis of animals and man. A typical ointment formulation is given in Example VIII below.

It is not intended that the finished formulations of my fungicidally active compounds be limited to any particular concentration range. The concentration range desired in my invention is that range necessary to accomplish the desired end. A preferred range for agricultural application is between 0.1 and 2,000 parts per million. Formulations containing as high as 30 percent active ingredient are used in treating animals and man. Typical formulations of this invention are described in the following examples in which all parts are by weight.

The compounds in the following examples will have the designations given below:

I. Butadiene iron tricarbonyl
II. Ethyl sorbate iron tricarbonyl
III. Acetylbutadiene iron tricarbonyl
IV. Sorbic acid iron tricarbonyl
V. Butadiene iron tricarbonyl
VI. Ethyl sorbate iron tricarbonyl
VII. Acetylbutadiene iron tricarbonyl
VIII. Sorbic acid iron tricarbonyl

EXAMPLE I (WATER SUSPENSION)

A formulation of Compound I is prepared by adding, with vigorous agitation, 10 parts of this material to 1,000 parts of water containing 1 part of Tween-80. This concentrated dispersion is further diluted 1,000 times by the addition of water to obtain a formulation of suitable concentration for application. Thus, the resulting dispersion contains 10 parts per million of my fungicide in the water dispersion.

EXAMPLE II (ORGANIC SOLUTION)

A solution consisting of 5 parts of Compound II in 250 parts of cyclohexanone is prepared by stirring the two constituents for a period of two minutes at a temperature of about 25° C. This concentrated solution suitable for storage or transportation is further diluted with 99,750 parts of kerosene to form a final dilution of 50 p.p.m. suitable for application.

EXAMPLE III (OIL IN WATER EMULSION)

An oil and water emulsion is prepared by dissolving 10 parts of Compound III in 1,000 parts of kerosene. This solution is dispersed with vigorous agitation in 99,000 parts of water containing one part of Triton X-100 to provide a dispersion containing 100 p.p.m. of active ingredient.

EXAMPLE IV (DUST FORMULATION)

A dust formulation of the fungicide is prepared by adding one part of Compound IV to 100 parts of fuller's earth in a ball mill. The mixture is milled for a period of one hour, screened to collect a fraction passing a 100 mesh sieve. This one percent formulation can be applied directly or further diluted. Further dilution is made by repeating the above procedure with an additional 9,900 parts of fuller's earth.

EXAMPLE V (WETTABLE POWDER)

A mixture of 100 parts of Compound V, 1,000 parts of Attaclay and 0.01 part of Nacconol is intimately mixed in an L-shaped blender. The 10 percent wettable powder thus prepared produces a satisfactory water suspension when 11 parts are stirred into 10,000 parts of water, producing a suspension containing 100 p.p.m. active ingredient.

EXAMPLE VI (COLLOIDAL FORMULATION)

A colloidal formulation is prepared by passing a mixture of 10 parts of Compound VI, 100 parts of kerosene, 1000 parts of water and 1 part of mannitan monooleate through the colloid mill until homogenation of the oil in water is achieved.

EXAMPLE VII (AEROSOL FORMULATION)

Into a cylinder rated at 100 p.s.i. working pressure, is introduced 10 parts of Compound VII. The cylinder is then made pressure tight except for one opening through which is introduced a mixture of 10 parts acetone and 50 parts of dichloro difluoromethane from a container at 2000 p.s.i. The cylinder into which the ingredients are introduced is then sealed off and inverted to give a uniform aerosol solution of my active materials in the mixture of co-solvents.

EXAMPLE VIII (OINTMENT)

2000 parts of Compound VIII is ground in a ball mill until it is no longer gritty and then passed through a fine mesh sieve. The powder is then transferred to a suitable mixing vessel and 10,000 parts of white petrolatum, U.S.P., is added. The mixture is mixed until all powder is suspended within the petrolatum in the form of a fine paste. Then the remainder of 998,000 parts of white petrolatum is added and the mixture again thoroughly mixed until a homogenous product is obtained.

The fungicidal effectiveness of my compounds was demonstrated by one or more of the following tests.

*Agar-Plate Technique*

The compounds were screened for anti-fungal activity by the Agar-Plate Technique against five fungi representing groups of economic importance. The test fungi and their occurrences are as follows:

*Aspergillus niger*—mildew of fabrics and leather, molding of fruit, bakery goods and stored grain.
*Penicillium expansum*—molding of stored grain, hay and fruit.
*Alternaria solani*—early blight of potato and tomato.
*Glomerella cingulata*—bitter rot of apples.
*Trychophyton interdigitale*—pathogenic for man and animals.

Specifically, the method was the Agar-Plate Technique, USDA Circular No. 198, pages 12 and 14, 1931. The medium employed was Sabouraud Dextrose Agar. This medium is used for carrying the stock cultures as well as for the test itself. The agar is put into solution and then cooled to 42–45° C. To this is added a saline spore suspension of the test organism. The inoculated agar is then poured into sterile Petri dishes and allowed to harden. A suitable amount of the compound tested was placed on a one square centimeter area in the center of the agar. If the compound was solid, the compound was sprinkled upon this area of the plate. When the compound was a liquid, a depression was cut out in the center of the Agar by means of a cork borer having a diameter of 1.5 mm. Four drops of the liquid compound were placed in this depression. The agar plates were incubated for 5 days at 25° C. If the compound is inhibitory, a zone of clear Agar will be noted around the area of inoculation. The size of this zone is measured, and is an indication of the inhibitory value of the compound tested. The diffusibility of the compound will affect the area of inhibition. If the compound tested has no antifungicidal activity, there will be no area of inhibition, and in some cases, growth will appear under the compound tested.

*Serial dilution tests*

The sample was tested for activity against the same five fungi utilized in the Agar Plate Technique. The fungi for all tests were grown in a Bacto Sabouraud Liquid Medium, pH of 5.7. The sample was dissolved in a minimal quantity of ethanol and diluted with sterile water thereafter to give an original concentration of 512 p.p.m. The test cultures were grown upon the Bacto Sabouraud Dextrose Agar for 10 days. A heavy spore suspension was prepared in buffered distilled water. The inoculum for each tube was one drop of the heavy spore suspension. The test cultures were incubated at 30° C. for 10 days. An effective concentration of 250 parts per million (p.p.m.) is generally accepted as the maximum concentration at which a chemical can be considered for use as an agricultural fungicide.

Further screening of representative types of these compounds was carried out by the serial dilution test according to Burlingame and Reddish, J. Lab. Clin. Med. 24, page 765, 1939. The test fungi used in this case were *Trichophyton interdigitale, Trichophyton rubrum, Trycophyton schoenleinii, Microsporum audouini, Epidermophyton floccosum, Microsporum gypseum.* These fungi were grown in Difco's Sabouraud's liquid medium, pH 4.7. Sample preparation consisted of dissolving aliquots of each compound in 10 mls. of ethanol and diluting to 512 p.p.m. concentrations with distilled water. These stock solutions were serially diluted through 10 tubes of culture medium. The inoculum consisted of 1 drop per tube of a heavy spore suspension of the test fungi. The tests were incubated at 35° C. for one week.

Particular effectiveness of the samples in this series of tests indicates possible therapeutic use in the treatment of athletes foot, ringworm of the nails and scalp and external fungal infection of animals. Some presently commercial fungicides, utilized in this field of therapy, contain an active ingredient in concentrations as high as 30 percent by weight (300,000 parts per 1,000,000).

*Foliar fungicide screening*

*Cereal leaf rust wheat* is grown in soil in paper pots with 20–30 plants per pot. When the plants are 6–8 inches tall, they are sprayed with the test solutions, (300 p.p.m. and 75 p.p.m. concentration) with three pots used for each treatment applied. After the spray treatments have dried thoroughly, the plants are sprayed with a suspension of spores of wheat leaf rust disease, *Puccinia rubigovera,* reared on live wheat leaf culture. After one week to ten days, disease symptoms are observed and percent control obtained by comparison of the sample with inoculated controls and manzate-treated positive controls.

*Tomato late blight.*—Susceptible species tomato plants are treated from seed and transplanted into soil in individual paper pots. When they are 6 to 8 inches high, they are sprayed with the test solutions (300 p.p.m. and 75 p.p.m. concentration) with three plants used for each treatment applied. After the spray treatments have dried thoroughly, the plants are sprayed with a suspension of spores of the tomato late blight fungus, *Phytophthora infestans,* which is reared on lima bean agar culture. After a few days to one week disease symptoms are observed and percent control obtained by comparison of the sample with inoculated controls and manzate-treated positive controls.

*Powdery mildew of cucumbers.*—Susceptible species cucumbers are grown in soil in paper pots with 2–3 plants per pot. When the first leaf has reached a size of about 3 inches in diameter, they are sprayed with the test solutions (300 p.p.m. and 75 p.p.m. concentration) with 3 pots used for each treatment applied. After the spray treatments have dried thoroughly, the plants are dusted with spores of powdery mildew fungus, *Erysiphe cichoracearum,* reared on live cucumber leaf culture. After one week to ten days, disease symptoms are observed and percent control obtained by comparison of the sample with inoculated controls and Karathane-treated positive controls.

*Agar plate*

[Zone of Inhibition in Millimeters]

| | An | Pe | As | Gc | Ti* |
|---|---|---|---|---|---|
| Butadiene iron tricarbonyl | 2 | 1 | 2 | 4 | 80 |
| Ethyl sorbate iron tricarbonyl | | | | | 90 |
| Acetylbutadiene iron tricarbonyl | 2 | 3 | 5 | 3 | 40 |
| Sorbic acid iron tricarbonyl | | | | | 1 |

* See footnote below.

*Serial dilution*

[Minimum effective concentration in p.p.m. 250 p.p.m. or less considered good activity]

| | An | Pe | As | Gc | Ti* |
|---|---|---|---|---|---|
| Butadiene iron tricarbonyl | 256 | 256 | 128 | 256 | 128 |

*An=*Aspergillus niger;* Pe=*Penicillium expansum;* As=*Alternaria solani;* Gc=*Glomerella cingulata;* Ti=*Trychophyton interdigitale.*

*Serial dilution*

FUNGI PATHOGENIC TO MAN AND ANIMALS

[Minimum effective concentration in parts per million]

| | Ma | Mg | Tr | Ef | Ts | Ti* |
|---|---|---|---|---|---|---|
| Butadiene iron tricarbonyl | 128 | 128 | 128 | 512 | 256 | |
| Ethyl sorbate iron tricarbonyl | 64 | 128 | 128 | 128 | | 32 |

*Ma=*Microsporum audouini;* Mg=*Microsporum gypseum;* Tr=*Trychophyton rubrum;* Ef=*Epidermophyton fluoccosum;* Ts=*Trychophyton schoenleinii;* Ti=*Trychophyton interdigitale.*

*Foliage fungicide test*

[Per cent kills/concentration parts per million]

| | TLB | PMC | LRW* |
|---|---|---|---|
| Butadiene iron tricarbonyl | 40/300 | 0/300 | 20/300 |

*TLB=Tomato late blight; PMC=Powdery mildew cucumber; LRW =Leaf rust wheat.

I claim:
1. A fungicidal composition consisting of
(a) as a principal active ingredient a compound having the formula

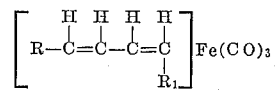

wherein R is selected from the class consisting of hydrogen and the methyl radical and $R_1$ is selected from the class consisting of hydrogen,

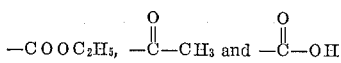

(b) from 0.1 to 5 weight percent of a surface active dispersing agent as a dispersant therefor, and
(c) the remainder of said composition consisting essentially of a solid carrier selected from the class consisting of talc, attaclay, kieselguhr, chalk, diatomaceous earth, soybean flour, tobacco flour, walnut shell flour, gypsum, mica, apatite, pumice and fuller's earth.

2. A fungicidal composition of claim 1 wherein said principal active ingredient is ethylsorbate iron tricarbonyl.

3. A fungicidal composition of claim 1 wherein said principal active ingredient is butadiene iron tricarbonyl.

4. A fungicidal composition of claim 1 wherein said principal active ingredient is acetylbutadiene iron tricarbonyl.

5. A fungicidal composition of claim 1 wherein said principal active ingredient is sorbic acid iron tricarbonyl.

6. Method of combating fungi comprising treating the locus of the fungi with a fungitoxic amount of a compound having the formula

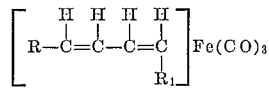

wherein R is selected from the class consisting of hydrogen and the methyl radical and $R_1$ is selected from the class consisting of hydrogen

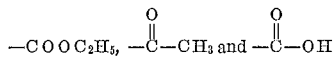

7. Method of combating fungi comprising treating the locus of the fungi with a fungitoxic amount of ethylsorbate iron tricarbonyl.

8. Method of combating fungi comprising treating the locus of the fungi with a fungitoxic amount of butadiene iron tricarbonyl.

9. Method of combating fungi comprising treating the locus of the fungi with a fungitoxic amount of acetylbutadiene iron tricarbonyl.

10. Method of combating fungi comprising treating the locus of the fungi with a fungitoxic amount of sorbic acid iron tricarbonyl.

References Cited by the Examiner
UNITED STATES PATENTS

| | | | |
|---|---|---|---|
| 2,178,099 | 10/1939 | Gornitz et al. | 260—431 |
| 2,208,253 | 7/1940 | Flenner et al. | 167—22 |
| 2,278,965 | 4/1942 | Van Peski et al. | 260—429 |
| 2,818,416 | 12/1957 | Brown et al. | 260—429 |
| 2,818,417 | 12/1957 | Brown et al. | 260—429 |
| 2,898,354 | 8/1959 | Shapiro et al. | 260—429 |
| 2,864,843 | 12/1958 | De Witt et al. | 260—429 |
| 2,898,354 | 8/1959 | Shapiro et al. | 260—429 |
| 2,916,503 | 12/1959 | Kozikowski | 260—429 |
| 2,964,547 | 12/1960 | De Witt et al. | 260—429 |
| 2,964,548 | 12/1960 | Brown et al. | 260—429 |
| 2,976,285 | 3/1961 | Gash | 260—242 |
| 2,976,303 | 3/1961 | Shapiro et al. | 260—429 |
| 2,976,304 | 3/1961 | De Witt et al. | 260—429 |
| 2,988,562 | 6/1961 | Winmayer | 260—439 |
| 2,988,564 | 6/1961 | Graham | 260—439 |
| 3,007,953 | 11/1961 | Closson et al. | 260—429 |
| 3,009,766 | 11/1961 | Sandel | 23—14 |
| 3,030,399 | 4/1962 | Thomas | 260—438 |
| 3,032,570 | 5/1962 | Haslam | 260—429.5 |
| 3,035,074 | 5/1962 | Haven | 260—439 |

OTHER REFERENCES

Encyclopedia of Chemical Technology entries: "Carbonyl Compounds," "Carbonyl," vol. 3, pp. 201–205, published 1949 by Interscience Encyclopedia, Inc., New York, N.Y.

LEWIS GOTTS, *Primary Examiner.*

MORRIS O. WOLK, *Examiner.*